(12) United States Patent
Samuel et al.

(10) Patent No.: US 10,837,262 B2
(45) Date of Patent: Nov. 17, 2020

(54) DIRECTIONAL TENDENCY PREDICTORS FOR ROTARY STEERABLE SYSTEMS

(71) Applicant: LANDMARK GRAPHICS CORPORATION, Houston, TX (US)

(72) Inventors: Robello Samuel, Cypress, TX (US); Yuan Zhang, Missouri City, TX (US)

(73) Assignee: LANDMARK GRAPHICS CORPORATION, Houston, TX (US)

( * ) Notice: Subject to any disclaimer, the term of this patent is extended or adjusted under 35 U.S.C. 154(b) by 0 days.

(21) Appl. No.: 15/326,424

(22) PCT Filed: Aug. 11, 2014

(86) PCT No.: PCT/US2014/050582
§ 371 (c)(1),
(2) Date: Jan. 13, 2017

(87) PCT Pub. No.: WO2016/024945
PCT Pub. Date: Feb. 18, 2016

(65) Prior Publication Data
US 2017/0211356 A1    Jul. 27, 2017

(51) Int. Cl.
*E21B 41/00*    (2006.01)
*E21B 7/06*    (2006.01)
*G05B 17/02*    (2006.01)

(52) U.S. Cl.
CPC .......... *E21B 41/0092* (2013.01); *E21B 7/062* (2013.01); *G05B 17/02* (2013.01)

(58) Field of Classification Search
CPC .................................................. E21B 41/0092
See application file for complete search history.

(56) References Cited

U.S. PATENT DOCUMENTS 4,467,879 A * 8/1984 Burge ................. E21B 17/1078
175/325.4
5,727,641 A * 3/1998 Eddison ................. E21B 7/068
175/76

(Continued)

FOREIGN PATENT DOCUMENTS

WO    2010/059295    5/2010
WO    2010/083261    7/2010
WO    2012/024474    2/2012

OTHER PUBLICATIONS

PCT International Search Report and Written Opinion, dated Jun. 4, 2015, Appl No. PCT/US2014/050582, "Directional Tendency Predictors for Rotary Steerable Systems," filed Aug. 11, 2014, 10 pgs.

(Continued)

*Primary Examiner* — Hyun D Park
(74) *Attorney, Agent, or Firm* — Gilliam IP PLLC (57) ABSTRACT

A method includes determining a first geometric parameter of an elastic component based on a second geometric parameter of the elastic component, wherein the elastic component is part of a bottomhole assembly having a bit and an eccentering mechanism operating on the elastic component. The method also includes determining a length difference of the elastic component based on the first geometric parameter, the second geometric parameter, and a stiffness factor of the elastic component. The method also includes determining a borehole curvature based on a sum of a bit tilt angle and a force-based side-cutting angle, wherein the force-based side-cutting angle is based on the length difference of the elastic component. The method also includes determining a setting of the eccentering mechanism based on the borehole curvature.

24 Claims, 4 Drawing Sheets

(56) References Cited

U.S. PATENT DOCUMENTS

| | | | |
|---|---|---|---|
| 6,438,495 | B1 | 8/2002 | Chau et al. |
| 2,348,554 | A1 | 1/2006 | Chau et al. |
| 8,534,380 | B2 | 9/2013 | Sheppard et al. |
| 2004/0231893 | A1 | 11/2004 | Kent |
| 2005/0150689 | A1 | 7/2005 | Jogi et al. |
| 2007/0029111 | A1* | 2/2007 | Chen .................. E21B 7/04 175/24 |
| 2010/0175922 | A1 | 7/2010 | Ignova et al. |
| 2010/0324825 | A1* | 12/2010 | Detournay .......... E21B 10/00 702/6 |
| 2011/0015911 | A1 | 1/2011 | Chen |
| 2011/0024126 | A1 | 2/2011 | Brouwer |
| 2011/0031023 | A1 | 2/2011 | Menezes et al. |
| 2013/0008724 | A1 | 1/2013 | Endres et al. |
| 2013/0341098 | A1 | 12/2013 | Perrin et al. |
| 2015/0247399 | A1 | 9/2015 | Doelalikar et al. |

OTHER PUBLICATIONS

PCT International Search Report and Written Opinion, dated Aug. 29, 2016, Appl No. PCT/US2015/065566, "Dogleg Severity Estimator for Point-The-Bit Rotary Steerable Systems," Filed Dec. 14, 2015, 11 pgs.

AU Application Serial No. 2014403383, Examination Report No. 2, dated Dec. 15, 2017, 4 pages.

CA Application Serial No. 2954264; Canadian Requisition by Examiner; dated Nov. 29, 2017, 5 pages.

Extended European Search Report Application Serial No. 14899834.7; dated Oct. 2, 2017, 5 Pages.

Zhang, "Side Force and Directional Tendency of BHA with Eccentric Components", Presented Dec. 31, 2013, 89 pages.

CA Application Serial No. 2,954,264, Requisition by the Examiner, dated Jul. 9, 2018, 5 pages.

EP Application Serial No. 14899834.7, Communication Pursuant to Article 94(3) EPC, dated Jul. 11, 2018, 10 pages.

Sugiura, et al., "Optimal BHA Design for Steerability and Stability with Configurable Rotary-Steerable System", Oct. 1, 2008, XP055408971, pp. 1-13.

European Application Serial No. 14899834.7; Communication Pursuant to Article 94(3); dated Jan. 17, 2019, 8 pages.

CA Application Serial No. 2,954,264, Examination Report, dated Mar. 21, 2019, 6 pages.

Canadian Application Serial No. 2,954,264; Office Action; dated Dec. 4, 2019, 5 pages.

* cited by examiner

DIRECTIONAL TENDENCY PREDICTORS FOR ROTARY STEERABLE SYSTEMS

BACKGROUND

Directional drilling is the process of directing the borehole along a defined trajectory. Deviation control during drilling is the process of keeping the borehole trajectory contained within specified limits, e.g., limits on the inclination angle or distance from the defined trajectory, or both. Both have become important to developers of unconventional hydrocarbon resources.

Various drill string steering mechanisms exist to provide directional drilling and deviation control: whipstocks, mud motors with bent-housings, jetting bits, adjustable gauge stabilizers, and the increasingly popular rotary steering systems (RSS). These techniques each employ side force, bit tilt angle, or some combination thereof, to steer the drill string's forward and rotary motion. However, the resulting borehole's actual curvature is not determined by these parameters alone, and it is generally difficult to predict, necessitating slow drilling, frequent survey measurements, and in many cases, frequent trips of the drill string to the surface to repeatedly adjust the directional tendency of the steering assembly.

Every bottom hole assembly (BHA) drilling a deviated borehole rests on the low side of the borehole, thereby experiencing a reactive force that, depending on the geometry, causes the BHA to tend upward (increase borehole inclination due to a fulcrum effect), tend downward (decrease borehole inclination due to a pendular effect), or tend neutral (maintain inclination). Even for a given BHA, the directional tendencies may change due to, e.g., formation effects, bit wear, inclination angle, and parameters that affect stiffness (such as rotational speed, vibration, weight on bit, wash-outs). Parameters that can be employed to intentionally affect directional tendency include the number, placement and gauge of the stabilizers, the bend angle(s) associated with the steering mechanism, the distance of the bend(s) from the bit, and rotational speed, weight on bit, and rate of penetration.

Years of trial-and-error experience may be needed for a directional driller to reliably design and use a BHA with the desired directional tendency, selecting from a variety of components to appropriately configure a complex BHA, minimizing trips and non-productive time, providing the client with a wellbore trajectory that is smooth and accurate.

At least some previous attempts to predict borehole directional tendencies in the context of bent-sub steering systems have employed strain energy modeling or finite element modeling to represent the detailed physical interactions between the bottom hole assembly and the borehole while drilling. Yet the use of such modeling has been dismissed as unreliable and ineffective for a variety of reasons: such models require parameters that may be difficult to quantify, such as the hole gauge, the strength of the formation, and the bit anisotropy; they worked in only limited geographic areas; and model users were required to have significant expertise. See, e.g. background discussion of U.S. Pat. No. 6,438,495 (Chau et al.). Attention has turned instead to empirical approaches that, in our view, fail to adequately account for all of the relevant parameters, relying instead on unnecessarily frequent measurements to counter the inevitable errors, thereby producing undesirably undulatory and tortuous wellbores and the many problems associated therewith.

BRIEF DESCRIPTION OF THE DRAWINGS

Accordingly, there are disclosed herein force-model based directional tendency predictors for rotary steerable systems. In the drawings:

FIG. 8 is a graph showing the relationships predicted between the eccentricity provided by the non-rotating housing and the DLS for the point-the-bit system in a curved borehole It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

Presently, there exist no satisfactory force-model based directional tendency predictors for rotary steerable systems. The authors believe it is the existing models' failure to properly account for bit tilt that has caused all strain energy models and finite element models to be dismissed as unreliable and ineffective, thereby forcing drillers to rely on unnecessarily frequent measurements to adjust and control the borehole trajectory. Disclosed herein is a force-model based directional tendency predictor for rotary steerable systems that is expected to have significantly increased utility due in part to its ability to account for the directional effects of both side forces and bit tilt angles.

Figure 1:
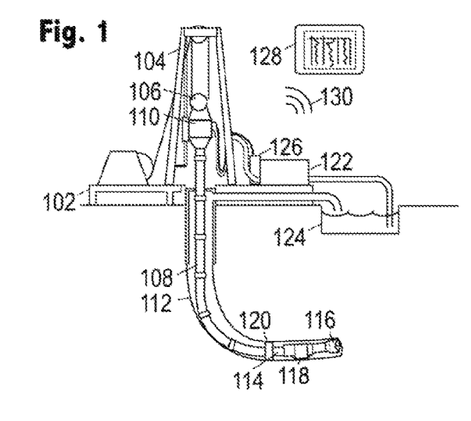
FIG. 1 is a schematic view of an illustrative directional drilling environment.

To provide context for the ensuing predictor discussion, an illustrative directional drilling environment is shown in FIG. 1. A drilling platform 102 supports a derrick 104 having a traveling block 106 for raising and lowering a drill string 108. A top drive 110 supports and rotates the drill string 108 as it is lowered into a borehole 112. The rotating drill string 108 and/or a downhole motor assembly 114 rotates a drill bit 116. As the drill bit 116 rotates, it extends the borehole 112 in a directed manner through various subsurface formations. The downhole assembly 114 includes a rotary steerable system (RSS) 118 which, together with one or more stabilizers 120, enables the drilling crew to steer the borehole along a desired path. A pump 122 circulates drilling fluid through a feed pipe to the top drive 110, downhole through the interior of drill string 108, through orifices in drill bit 116, back to the surface via the annulus around drill string 108, and into a retention pit 124. The drilling fluid transports cuttings from the borehole into the retention pit 124 and aids in maintaining the borehole integrity.

The drill bit 116 and downhole motor assembly 114 form just one portion of a bottom-hole assembly (BHA) that includes one or more drill collars (i.e., thick-walled steel pipe) to provide weight and rigidity to aid the drilling process. Some of these drill collars include built-in logging instruments to gather measurements of various drilling parameters such as position, orientation, weight-on-bit, torque, vibration, borehole diameter, downhole temperature and pressure, etc. The tool orientation may be specified in terms of a tool face angle (rotational orientation), an inclination angle (the slope), and compass direction, each of which can be derived from measurements by magnetometers, inclinometers, and/or accelerometers, though other sensor types such as gyroscopes may alternatively be used. In one specific embodiment, the tool includes a 3-axis fluxgate magnetometer and a 3-axis accelerometer. As is known in the art, the combination of those two sensor systems enables the measurement of the tool face angle, inclination angle, and compass direction. Such orientation measurements can be combined with gyroscopic or inertial measurements to accurately track tool position.

One or more logging while drilling (LWD) tools may also be integrated into the BHA for measuring parameters of the formations being drilled through. As the drill bit 116 extends the borehole 112 through the subsurface formations, the LWD tools rotate and collect measurements of such parameters as resistivity, density, porosity, acoustic wave speed, radioactivity, neutron or gamma ray attenuation, magnetic resonance decay rates, and indeed any physical parameter for which a measurement tool exists. A downhole controller associates the measurements with time and tool position and orientation to map the time and space dependence of the measurements. The measurements can be stored in internal memory and/or communicated to the surface.

A telemetry sub may be included in the bottom-hole assembly to maintain a communications link with the surface. Mud pulse telemetry is one common telemetry technique for transferring tool measurements to a surface interface 126 and to receive commands from the surface interface, but other telemetry techniques can also be used. Typical telemetry data rates may vary from less than one bit per minute to several bits per second, usually far below the necessary bandwidth to communicate all of the raw measurement data to the surface.

The surface interface 126 is further coupled to various sensors on and around the drilling platform to obtain measurements of drilling parameters from the surface equipment, parameters such as hook load, rate of penetration, torque, and rotations per minute (RPM) of the drill string.

A processing unit, shown in FIG. 1 in the form of a tablet computer 128, communicates with surface interface 126 via a wired or wireless network communications link 130, and provides a graphical user interface (GUI) or other form of interactive interface that enables a user to provide commands and to receive (and optionally interact with) a visual representation of the acquired measurements. The measurements may be in log form, e.g., a graph of the borehole trajectory and/or measured parameters as a function of time and/or position along the borehole. The processing unit can take alternative forms, including a desktop computer, a laptop computer, an embedded processor, a cloud computer, a central processing center accessible via the internet, and combinations of the foregoing.

In addition to the uphole and downhole drilling parameters and measured formation parameters, the surface interface 126 or processing unit 128 may be further programmed with additional parameters regarding the drilling process, which may be entered manually or retrieved from a configuration file. Such additional parameters may include, for example, the specifications for the drill string and BHA, including drilling tubular and collar materials, stabilizer diameters and positions, and limits on side forces and dogleg severity. The additional information may further include a desired borehole trajectory and limits on deviation from that trajectory. Experiences and logs from standoff wells may also be included as part of the additional information.

Figure 2:
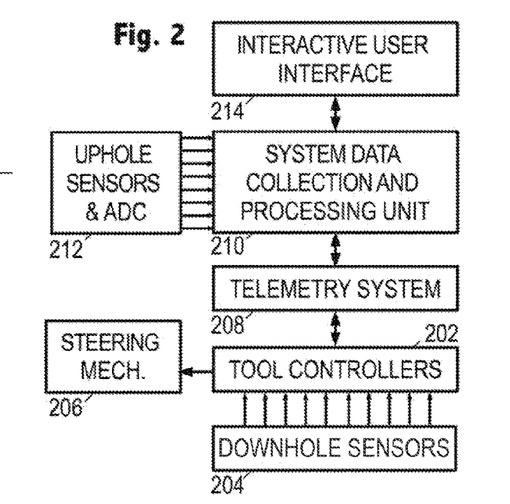
FIG. 2 is a block diagram of an illustrative directional drilling system.

FIG. 2 is a function-block diagram of an illustrative directional drilling system. One or more downhole tool controllers 202 collect measurements from a set of downhole sensors 204, preferably but not necessarily including both drilling parameter sensors and formation parameter sensors, to be digitized and stored, with optional downhole processing to compress the data, improve the signal to noise ratio, and/or to derive parameters of interest from the measurements.

A telemetry system 208 conveys at least some of the measurements or derived parameters to a processing system 210 at the surface, the uphole system 210 collecting, recording, and processing the telemetry information from downhole as well as from a set of sensors 212 on and around the rig. Processing system 210 generates a display on interactive interface 214 of the relevant information, e.g., measurement logs, borehole trajectory, or extracted values such as directional tendency and recommended drilling parameters to achieve the desired steering. The processing system 210 may further accept user inputs and commands and operate in response to such inputs to, e.g., transmit commands and configuration information via telemetry system 208 to the downhole processor 206. Such commands may alter the settings of the steering mechanism.

Figure 3:
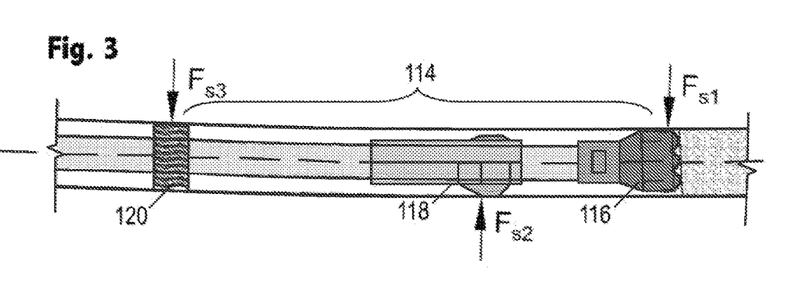
FIG. 3 is a schematic side view of an illustrative push-the-bit steering mechanism.

FIG. 3 shows an illustrative RSS of the push-the-bit type, which employs a non-rotating sleeve with a push pad 118 that can press against a selected side of the borehole, acting as an eccentering mechanism that introduces an adjustable eccentricity, thereby experiencing a side force $F_{S2}$. The bit 116 and the stabilizer 120 experience reactive side forces $F_{S1}$ and $F_{S3}$. As discussed in greater detail below, the balance of forces on the BHA introduce some degree of side-cutting by the bit and some degree of bit tilt, which combine to yield a total walk angle for the BHA.

Figure 4:
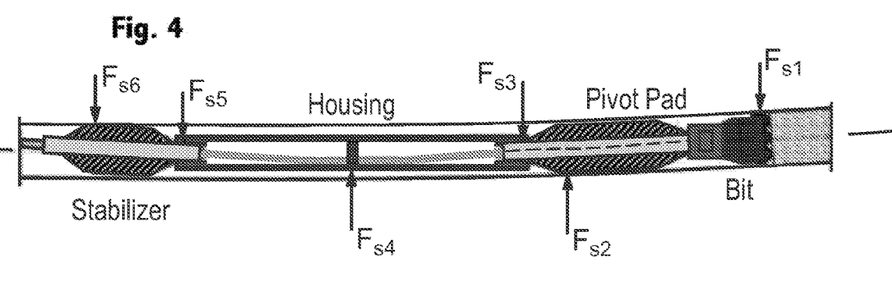
FIG. 4 is a schematic side view of an illustrative point-the-bit steering mechanism.

FIG. 4 shows an illustrative RSS of the point-the-bit type, which employs a non-rotating housing that introduces an adjustable bend in the drill string, resulting in a controllable bit tilt angle. (An eccentricity ring within the housing acts as an eccentering mechanism to provide the adjustable bend.) Attached to the housing are a stabilizer and a non-rotating pivot pad. In addition to an internal side force $F_{S4}$ exerted by the housing on the shaft of the drill string, the bit, the pivot pad, the housing ends, and the stabilizer each experience respective side forces $F_{S1}$, $F_{S2}$, $F_{S3}$, $F_{S5}$, and $F_{S6}$. The balance of these forces further affect the bit tilt angle and introduce some degree of side cutting, which together yield a total walk angle for the BHA.

Figure 5A:
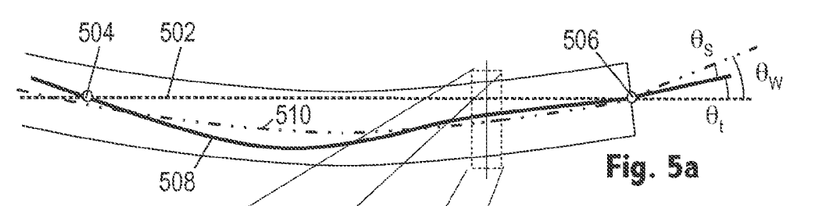
FIGS. 5a-5c are line drawings illustrating certain geometric parameters of a steering mechanism in a curved borehole.
Figure 5B:
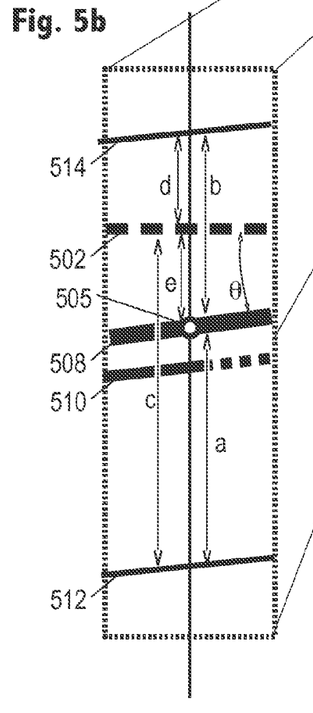
Figure 5C:
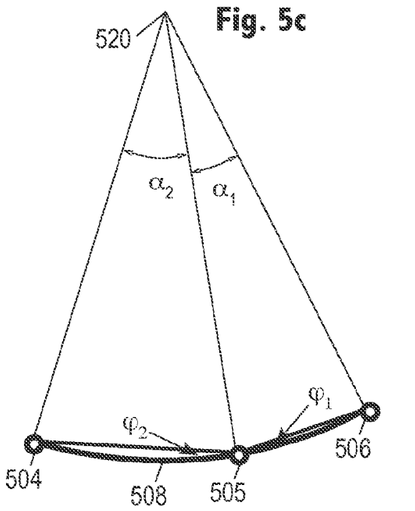

FIGS. 5a-5c introduce certain geometrical parameters that are useful for formulating the force-model based directional tendency predictor. A baseline 502 is defined to extend from the BHA axis at the top of the steering mechanism, i.e., point 504, to the BHA the BHA axis at the tip of the bit, i.e., point 506. The top of the steering mechanism may be taken as the upper-most component from which a side force can affect the walk angle. With regard to FIGS. 3 and 4, the top is taken to be the stabilizer above the non-rotating push pad or the non-rotating housing.

The baseline 502 may be taken as the x-axis of a tool reference system. In the figures, positive angles are measured clockwise, with the y-axis set at 90°. When the BHA is divided into segments, the local x-axis for each segment extends bit-ward from the uphole node, parallel to the tangent of the BHA axis at that point. Angles and moments are measured clockwise, with the local y-axis at 90°.

Also shown in FIG. 5a are the BHA axis 508 and the borehole axis 510. Baseline 502, BHA axis 508, and borehole axis 510 all intersect at the tip of the bit (point 506) to define three angles. The angle between the baseline 502 and the BHA axis 508 is the bit tilt angle θt. The angle between the BHA axis 508 and the borehole axis 510 is the side-cutting angle θs. Note that θt and θs need not have the same sign. When added together, they yield the walk angle θw, which is also the angle between the baseline 502 and the borehole axis 510.

FIG. 5b shows a magnified view of a portion of FIG. 5a, with a node 505 between BHA segments. The nodes are on the BHA axis 508 and they will be indexed, with each node i having associated distances $a_i$, $b_i$, $c_i$, $e_i$, and angle $\theta_i$. Distance a is the separation along the positive y-axis of the tool between the node 505 and the borehole wall 512. Distance b is the separation along the negative y-axis of the tool between node 505 and borehole wall 514. Distance c is the separation between the baseline 502 and borehole wall 512. Distance d is the separation between the baseline 502 and borehole wall 514. Distance e is the (signed) separation between the node 505 and the baseline 502. Angle θ is the interior angle between the baseline 502 and the tangent to the BHA axis 508 at node 505.

FIG. 5c shows an illustrative segmentation of a BHA by an added node 505 between the top 504 and the tip. If the borehole is assumed to follow a continuous circular arc having a center 520, the two segments subsume angles $\alpha_1$, and $\alpha_2$, respectively, with corresponding chords of the circle. The chords form interior angles φ1 and φ2 with the BHA axis tangent at point 505.

Given the foregoing, the analysis may proceed as follows. The side-cutting angle θs is expressible as:

$$\theta_s = \arctan\left(\frac{ROS}{ROP}\right) \approx \frac{ROS}{ROP}, \tag{1}$$

where ROS stands for rate of side-cutting, and ROP stands for rate of penetration. In 1986, J. F. Brett observed that the lateral penetration rate can be expressed as $$ROS = \frac{A(F_{s1})^2}{S_r}, \tag{2}$$

where ROS is the side cutting rate in ft/hr, $F_{s1}$ is the total side force at the bit in lbs, $S_r$ is a dimensionless rock strength, and A is an empirically determined factor for directional response of building, dropping and holding assemblies. Shortly thereafter, Onyia (1987) and Warren (1987) introduced a method to calculate $S_r$.

The walk angle is the summation of the tilt angle and the side-cutting angle, which is expressible as $$\theta_w = \theta_t + \theta_s. \tag{3}$$

It is the combined effect of both the tilt angle and the side-cutting angle that creates the deviation of the drilling direction. Assuming a continuous, circular arc, the dogleg severity (DLS), which is the rate at which borehole direction changes, can be expressed in terms of walk angle as $$DLS \approx 2\frac{\theta_w}{L}. \tag{4}$$

The exact form of the force model that relates DLS to the side force and steering assembly geometry naturally depends on the assumptions. In the following analysis, we adopt four different sets of assumptions and demonstrate the resulting directional tendency models. The assumptions represent: (A) a rigid push-the-bit steering assembly; (B) an elastic push-the-bit steering assembly; (C) a point-the-bit steering assembly in a straight borehole; and (D) a point-the-bit steering assembly in a curved borehole.

Rigid Push-the-Bit

For the rigid push-the-bit steering assembly, all the components of the BHA (and the borehole walls) are assumed to be rigid without deformation. The stabilizer 120 is a (rigid) concentric component installed on the drilling pipe. The non-rotating push pad 118 is a (rigid) hydraulically actuated pad installed near the drill bit that generates eccentricity by extending its foot to push against the wellbore when drilling directionally. The drill bit is normally has polycrystalline diamond compact (PDC) cutters that can drill both forward and laterally. The weight of the BHA is neglected here as it can be readily included as an offset in the final analysis.

Combining equations (2)-(4) with a geometric calculation of tilt angle θt yields the following force-model based expression for DLS:

$$DLS = \frac{2(e_1 - e_3)}{(L_1 + L_2)^2} - \frac{2A F_{s1}\sqrt{F_{s1}^2}}{ROP * S_r (L_1 + L_2)}, \tag{5}$$

where, for example, the tool axis-to-baseline separations can be expressed $$e_1 = -(r_w - r_b), \tag{6}$$

$$e_2 = r_w - r_p, \tag{7}$$

$$e_3 = -(r_w - r_s), \tag{8}$$

with $r_w$ being the borehole radius, $r_b$ being the bit radius, $r_p$ being the distance from the BHA axis to the contact face of the push pad (which may also be considered to be the adjustable setting of the eccentricity mechanism), $r_s$ being the stabilizer radius, $L_1$ being the length of the segment between the bit and the push pad, $L_2$ being the length of the segment between the push pad and the stabilizer, and A, $F_{s1}$, and $S_r$ are as previously defined for equation (2).

The DLS may also be expressed in terms of the BHA-to-borehole geometry as:

$$DLS = \frac{\varphi_1 + \varphi_2}{L_1 + L_2} = 2\left(\frac{b_1 - b_2}{L_1} - \frac{b_2 - b_3}{L_2}\right)/(L_1 + L_2), \tag{9}$$

where, for example, the tool axis-to-wall separations can be expressed $$b_1 = -r_b, \tag{10}$$

$$b_2 = -(2r_w - r_p), \tag{11}$$

$$b_3 = -r_s. \quad (12)$$

For analytical purposes, equations (5) and (9) can be combined to show the side force that results from the geometrical parameters including the adjustable eccentricity provided by the eccentering mechanism:

$$|F_{s1}| = \sqrt{\frac{ROP * S_r}{A} \left| \frac{b_1 - b_2}{L_1} + \frac{b_3 - b_2}{L_2} + \frac{b_1 - b_3}{L_1 + L_2} \right|}. \quad (13)$$

By relating the side force to the adjustable control parameter, equation (13) enables determination of side-cutting angle, as well as bit tilt and walk angles, as a function of the control parameter value (eccentricity introduced by the push pad). Together, equations (5), (9), and (13) represent an analytic model that enables the various DLS parameters to be related to eccentricity, enabling enhanced BHA design and application to directional drilling.

Elastic Push-the-Bit

For the elastic push-the-bit steering assembly, we relax the assumption of a rigid BHA, allowing for a bend to form in the BHA due to the spacing of the side forces $F_{s1}$, $F_{s2}$, $F_{s3}$ (shown in FIG. 3). Specifically, the non-rotating push pad 118 presses upward while the borehole wall presses downward on the stabilizer and the bit, causing a bow to form in the BHA, resulting in a bending angle and deflection that varies as a function of position. The bit tilt angle θt and side-cutting angle θs may be expected to have opposing signs or to at least combine in a fashion that might not otherwise be anticipated from a rigid body model.

Segmenting the elastic BHA into two segments and applying a 3-support continuous-string model (with the assumption of balanced static forces) yields two matrix equations. For the first segment, the matrix equation relating the internal forces to deformation takes the form:

$$\begin{bmatrix} -\frac{12i_1}{L_1^2} & \frac{6i_1}{L_1} & \frac{12i_1}{L_1^2} & \frac{6i_1}{L_1} \\ -\frac{6i_1}{L_1} & 2i_1 & \frac{6i_1}{L_1} & 4i_1 \\ \frac{12i_1}{L_1^2} & -\frac{6i_1}{L_1} & -\frac{12i_1}{L_1^2} & -\frac{6i_1}{L_1} \\ -\frac{6i_1}{L_1} & 4i_1 & \frac{6i_1}{L_1} & 2i_1 \end{bmatrix} \begin{Bmatrix} e_1 \\ \theta_1 \\ e_2 \\ \theta_2 \end{Bmatrix} = \begin{Bmatrix} Q_{1L} \\ M_{1L} \\ Q_{1R} \\ M_{1R} \end{Bmatrix}, \quad (14)$$

where $i_1$ is the stiffness factor of the first segment, $Q_{1L}$ and $M_{1L}$ are the shear force and moment applied on the "left" side of the segment (i.e., at the node representing the push pad) and $Q_{1R}$ and $M_{1R}$ are the shear force and moment applied on the "right" side of the segment (i.e., at the node representing the bit). The stiffness factor $i_1$ can be calculated as $$i_1 = \frac{EI_1}{L_1}, \quad (15)$$

where $L_1$ is the length of the first segment, $I_1$ is the moment of inertia of the first segment, and E is the modulus of elasticity (Young's modulus) of the first segment. With a suitable change of indices, equations 14 and 15 also apply to the second segment.

When force balancing is applied at the three nodes, the equations for the two segments require that the following equation hold true:

$$\begin{bmatrix} 4i_1 & 2i_1 & 0 \\ 2i_1 & 4(i_1 + i_2) & 2i_2 \\ 0 & 2i_2 & 4i_2 \end{bmatrix} \begin{Bmatrix} \theta_1 \\ \theta_2 \\ \theta_3 \end{Bmatrix} = \begin{Bmatrix} \frac{6i_1}{L_1}(e_1 - e_2) \\ \frac{6i_1}{L_1}(e_1 - e_2) - \frac{6i_2}{L_2}(e_2 - e_3) \\ \frac{6i_2}{L_2}(e_2 - e_3) \end{Bmatrix}. \quad (16)$$

The baseline-tangent angles $\theta_i$ can be found and substituted into the element equations, yielding the side force equation:

$$F_{s1} = Q_{1R} = \frac{3i_1}{L_1^2}(e_1 - e_2) - \frac{3i_1}{L_1}\theta_2 = \frac{3i_1 i_2(e_1 - e_2)}{L_1^2(i_1 + i_2)} - \frac{3i_1 i_2(e_2 - e_3)}{L_1 L_2(i_1 + i_2)}, \quad (17)$$

The walk angle is expressible as:

$$\theta_w = \quad (18)$$

$$\theta_t + \theta_s = -\frac{AF_{s1}\sqrt{(F_{s1})^2}}{ROP * S_r} + \frac{(e_1 - e_2)}{2L_1}\frac{2i_1 + 3i_2}{i_1 + i_2} - \frac{(e_2 - e_3)}{2L_2}\frac{i_2}{i_1 + i_2},$$

and the corresponding DLS is expressible as:

$$DLS = \quad (19)$$

$$-\frac{2AF_{s1}\sqrt{(F_{s1})^2}}{ROP * S_r(L_1 + L_2)} + \frac{(e_1 - e_2)(2i_1 + 3i_2)}{L_1(L_1 + L_2)(i_1 + i_2)} - \frac{(e_2 - e_3)i_2}{L_2(L_1 + L_2)(i_1 + i_2)}.$$

When the walk angle or DLS is positive, the drilling direction is drop-down; when the walk angle or DLS is negative, the drilling direction is build-up.

We note, however, that due to the assumed elasticity of the BHA, the value of $e_2$ is not readily calculable from the force balance analysis. Turning now to a geometrical analysis of the BHA-to-borehole relationship, we note (with reference to FIGS. 5a-5c):

$$d_1 \approx -r_w, \quad (20)$$

$$d_2 \approx -(2r_w - c_2) = -(2r_w - r_p - e_2), \text{ and} \quad (21)$$

$$d_3 \approx -r_w. \quad (22)$$

$$\varphi_1 + \varphi_2 \approx \left| \frac{d_1 - d_2}{L_1} - \frac{d_2 - d_3}{L_2} \right|. \quad (23)$$

yielding a DLS expressible as $$DLS = -2\frac{r_p + e_2 - r_w}{L_1 L_2}. \quad (24)$$

Equations (17), (21) and (26) can be solved jointly or iteratively. In an iterative approach, an assumed value of DLS may be used to estimate $e_2$ with equation (26), which may be used in equations (17) and (21) to determine a refined DLS value. The process can then be repeated with the refined DLS value, with each iteration yielding ever more refined estimates of $e_2$ and the DLS until convergence is achieved. As before, the pad radius $r_p$ functions as the adjustable setting for the eccentering mechanism, i.e., the pad.

Point-the-Bit (Straight Borehole)

For the point-the-bit steering assembly such as that shown in FIG. 4, a non-rotating housing is positioned between a stabilizer and a pivot pad. The housing is configured with a mechanism for deforming the drilling shaft, thereby enabling adjustment of the bit tilt angle and pushing the bit against the side of the borehole. The assumptions for this steering mechanism may include assuming that the borehole walls do not deform, the stabilizer, the housing, the pilot pad, and the bit are all rigid bodies. The only elastic body is the shaft inside the housing. The effects of the drill string above the BHA are assumed to be insignificant relative to the side forces exerted on the BHA, and the BHA weight is neglected here as it can be readily accounted for as an offset in the final analysis.

The assembly of FIG. 4 may be divided into segments between nodes where the side forces are applied. The shaft is modeled as a continuous (two-segment) beam supported by pins inside the housing. The remaining segments are large size components that can be considered as rigid bodies. The external forces on the steering assembly are applied by the borehole walls on the bit, the pivot pad, and the stabilizer.

Initially, the directional drilling begins from a straight borehole. Beginning with a geometrical analysis, the tool axis-to-baseline node eccentricities (except the eccentricity at the proximal end of the housing $e_5$) are calculable as:

$$e_1 = -(r_w - r_b), \quad (25)$$

$$e_2 = r_w - r_p, \quad (26)$$

$$e_3 = \frac{L_1 + L_2}{L_1} e_2 - \frac{L_2}{L_1} e_1, \quad (27)$$

$$e_4 = e_{o4} + e_{ec} = \frac{e_5 L_3 + e_3 L_4}{L_3 + L_4} + e_{ec} \text{ and} \quad (28)$$

$$e_6 = -(r_w - r_s). \quad (29)$$

where $e_{o4}$ is the distance between the housing axis and the baseline at node 4 (the location of the eccentric ring, which acts as the eccentering mechanism for steering the BHA), and $e_{ec}$ is the distance between the axis of the elastic shaft (as deformed by the eccentric ring) and the housing axis (i.e., the eccentricity introduced by the mechanism within the housing). Thus $e_{ec}$ functions as the adjustable setting for the eccentering mechanism. The angles between the BHA tangent and the baseline (except $\theta_4$) are calculable as:

$$\theta_1 = \theta_2 = \theta_3 = \frac{e_1 - e_2}{L_1} \text{ and} \quad (30)$$

$$\theta_5 = \theta_6 = \frac{e_5 - e_6}{L_5}. \quad (31)$$

Turning now to a force balance analysis, we note the global system is only supported at 3 points (the bit, the pivot pad and the stabilizer), providing the following force balance equations:

$$F_{s1}L_1 = F_{s6}(L_2 + L_3 + L_4 + L_5) \quad (32)$$

$$F_{s1} + F_{s2} + F_{s6} = 0, \quad (33)$$

$$F_{s1} + Q_{2L} + F_{s2} = 0, \text{ and} \quad (34)$$

$$F_{s1}(L_1 + L_2) + F_{s2}L_2 = M_{3R} = -M_{2L}. \quad (35)$$

These equations can be solved for the shear force $Q_{2L}$ and moment $M_{2L}$:

$$Q_{2L} = F_{s6} \text{ and } M_{2L} = -F_{s6}(L_3 + L_4 + L_5). \quad (36)$$

The shear force and moment of the element 5 are expressed as:

$$Q_{5R} = -Q_{5L} = -F_{s6} \text{ and } M_{5R} = F_{s6}L_5. \quad (37)$$

As the influences of the rigid segments on the elastic shaft are limited to the moments, shear forces, and deformations at the end of the shaft, the shaft's force balance equation can be expressed $$\begin{bmatrix} \left[\frac{6(i_3 + i_4)}{L_3 + L_4} + \frac{2i_4}{L_5}\right] & 4(i_3 + i_4) & 0 \\ \frac{6i_3}{L_3 + L_4} & 2i_3 & -(L_3 + L_4 + L_5) \\ \left[\frac{6i_4}{L_3 + L_4} + \frac{4i_4}{L_5}\right] & 2i_4 & L_5 \end{bmatrix} \begin{Bmatrix} e_5 \\ \theta_4 \\ F_{s6} \end{Bmatrix} = \quad (38)$$

$$\begin{Bmatrix} \frac{6(i_3 + i_4)}{L_3 + L_4} e_3 + 6\left(\frac{i_4}{L_4} - \frac{i_3}{L_3}\right)e_{ec} - \frac{2i_3}{L_1}(e_1 - e_2) + \frac{2i_4}{L_5} e_6 \\ \frac{6i_3}{L_3 + L_4} e_3 - \frac{4i_3}{L_4}(e_1 - e_2) - \frac{6i_3}{L_3} e_{ec} \\ \frac{6i_4}{L_3 + L_4} e_3 + \frac{6i_4}{L_4} e_{ec} + \frac{4i_4}{L_5} e_6 \end{Bmatrix}.$$

Solving, we obtain the 3 variables, $e_5$, $\theta_4$, $F_{s6}$, which can be substituted back into the element equations to obtain the various bending angles and side forces, including:

$$F_{s1} = \frac{L_2 + L_3 + L_4 + L_5}{L_1} F_{s6}. \quad (39)$$

The tilt angle is the angle between the axis of the drill bit and the baseline, as in:

$$\theta_t = \theta_1 = \frac{e_1 - e_2}{L_1}, \quad (40)$$

leading to the expression of DLS as:

$$DLS = \frac{2(e_1 - e_2)}{L_1 \sum_{i=1}^{i=5} L_i} - \frac{2AF_{s1}\sqrt{(F_{s1})^2}}{ROP * S_r \sum_{i=1}^{i=5} L_i} \quad (41)$$

This straight borehole analysis provides a foundation for the curved borehole analysis in the next section.

Point-the-Bit (Curved Borehole):

Accounting for variable curvature in the borehole in the geometrical analysis, the additional deflection and bending angles relative to the straight borehole can be expressed:

$$\alpha_i = \theta^*_{i-1} - \theta^*_i = -DLS_i * L_i, \quad (42)$$

where the asterisked angles are calculated:

$$\begin{cases} \theta_1^* = \frac{1}{2} DLS_i * \sum_{i=1}^{5} L_j, & j=1 \\ \theta_j^* = -DLS_i * L_{j-1} + \theta_{j-1}^*, & 1 < j < 6 \\ \theta_N^* = -\frac{1}{2} DLS_i * \sum_{i=1}^{5} L_j, & j=6 \end{cases} \quad (43)$$

Based on the asterisked angles, we can express straight-to-curved borehole deviation corrections (i.e., that portion of the deviation that is due to the geometric difference between the axis of a curved borehole and the axis of a straight borehole) as:

$$\begin{cases} e_1^* = 0, & j=1 \\ e_j^* = e_{j-1}^* - \frac{(\theta_{j-1}^* + \theta_j^*)L_{j-1}}{2}, & 1 < j < 6 \\ e_N^* = 0, & j=6 \end{cases} \quad (44)$$

The baseline deviations can be added to the node eccentricities from the straight borehole case to provide the deflections of the BHA from the baseline in curved wellbore, $e_{c1}$, $e_{c2}$, $e_{c3}$, $e_{c4}$, $e_{c5}$, $e_{c6}$. Except for the deviation at the proximal end of the housing $e_{c5}$, the deviations can be expressed by:

$$e_{c1} = e_1 + e_1^* = -(r_w - r_b), \quad (45)$$

$$e_{c2} = e_2 + e_2^* = r_w - r_p + e_2^*, \quad (46)$$

$$e_{c3} = \frac{L_1 + L_2}{L_1} e_{c2} - \frac{L_2}{L_1} e_{c1}, \quad (47)$$

$$e_{c4} = \frac{e_{c5} L_3 + e_{c3} L_4}{L_3 + L_4} + e_{ec}, \text{ and} \quad (48)$$

$$e_{c6} = e_6 + e_6^* = -(r_w - r_s). \quad (49)$$

The bending angles of the BHA in curved wellbore, $\theta_{c1}$, $\theta_{c2}$, $\theta_{c3}$, $\theta_{c4}$, $\theta_{c5}$, $\theta_{c6}$, are calculated from the deflections as $$\theta_{c1} = \theta_{c2} = \theta_{c3} = \frac{e_{c1} - e_{c2}}{L_1} \text{ and} \quad (50)$$

$$\theta_{c5} = \theta_{c6} = \frac{e_{c5} - e_{c6}}{L_5}. \quad (51)$$

Then, performing a force balance analysis similar to the straight-borehole scenario, the force balance equations for the shaft in BHA is (compare with equation (41)):

$$\begin{bmatrix} \left[\frac{6(i_3+i_4)}{L_3+L_4} + \frac{2i_4}{L_5}\right] & 4(i_3+i_4) & 0 \\ \frac{6i_3}{L_3+L_4} & 2i_3 & -(L_3+L_4+L_5) \\ \left[\frac{6i_4}{L_3+L_4} + \frac{4i_4}{L_5}\right] & 2i_4 & L_5 \end{bmatrix} \begin{Bmatrix} e_{c5} \\ \theta_{c4} \\ F_{s6} \end{Bmatrix} = \quad (52)$$

$$\begin{Bmatrix} \frac{6(i_3+i_4)}{L_3+L_4} e_{c3} + 6\left(\frac{i_4}{L_4} - \frac{i_3}{L_3}\right)e_{ec} - \frac{2i_3}{L_1}(e_{c1} - e_{c2}) + \frac{2i_4}{L_5} e_{c6} \\ \frac{6i_3}{L_3+L_4} e_{c3} - \frac{4i_3}{L_1}(e_{c1} - e_{c2}) - \frac{6i_3}{L_3} e_{ec} \\ \frac{6i_4}{L_3+L_4} e_{c3} + \frac{6i_4}{L_4} e_{ec} + \frac{4i_4}{L_5} e_{c6} \end{Bmatrix}$$

Solving, we obtain the 3 variables, $e_5$, $\theta_4$, $F_{s6}$, which can be substituted back into the element equations to obtain the various bending angles and side forces, including (as before)

$$F_{s1} = \frac{L_2 + L_3 + L_4 + L_5}{L_1} F_{s6}. \quad (53)$$

Having obtained the side force on the bit, the DLS for each borehole segment may be calculated as:

$$DLS_{i+1}^* = \frac{2(e_{c1} - e_{c2})}{L_1 \sum L_i} - \frac{2AF_{s1}\sqrt{(F_{s1})^2}}{ROP * S_r \sum L_i}. \quad (54)$$

Due to the initial dependence of the asterisked angles (see equation (46)) on $DLS_i$, equations (46)-(57) may be solved iteratively, beginning with the assumption of a straight borehole and using the updated DLS estimates for each new iteration until convergence is achieved. In this manner the DLS may be determined by alternating between the geometric analysis equations and the force balance analysis equations to obtain increasing refined estimates of the BHA geometry and the DLS or a related measure of directional tendency.

Tendency Prediction and Usage

Figure 6:
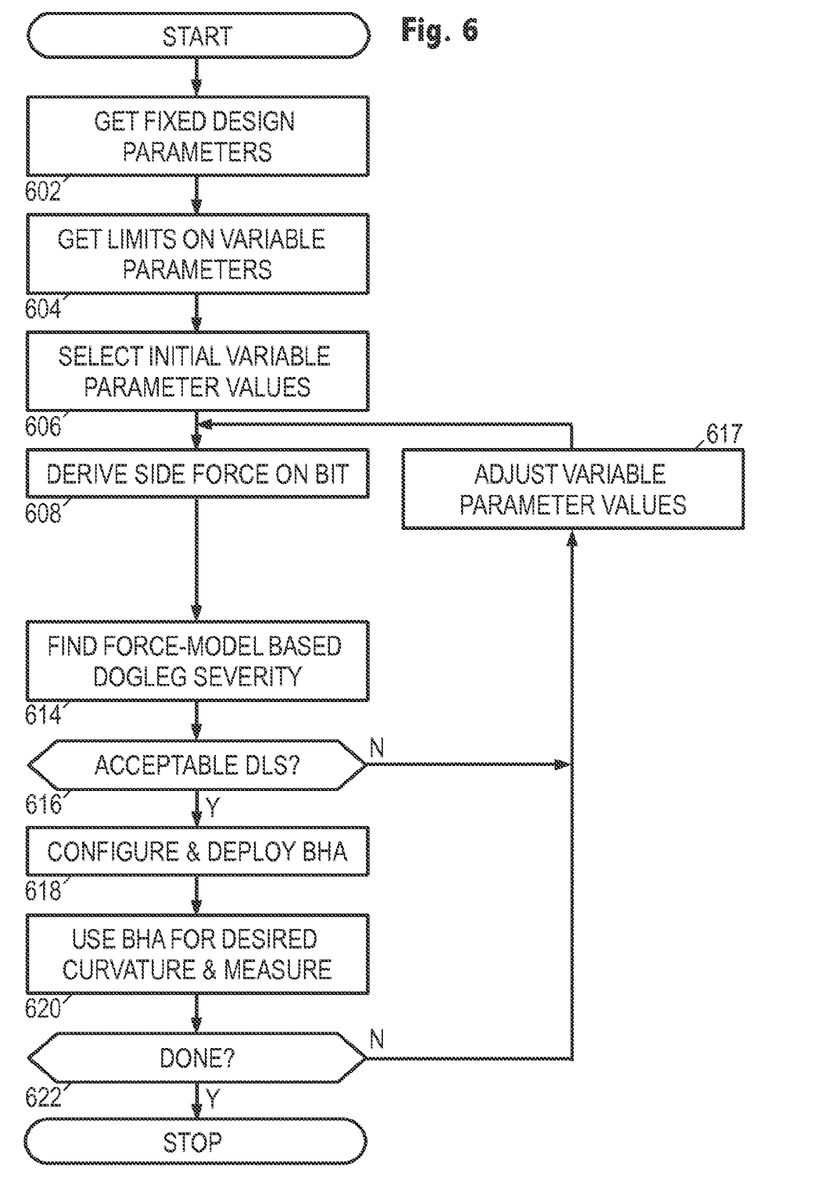
FIG. 6 is a flow diagram of an illustrative directional tendency predictor method.

FIG. 6 is a flow diagram of an illustrative method for predicting and using the BHA tendency using the models disclosed above, i.e., models that analytically or numerically interrelate the geometric and balanced-force analyses to account for both the tilt angle and side-cutting components of the total walk angle. The method may be implemented in the form of software stored on a non-transitory information storage medium and loaded into fast memory or cache for execution by a processor, with user input accepted via a user interface and results provided to the user via the user interface. The information storage, memory, processor, and user interface may be all included in a single computer (e.g., tablet computer 128 of FIG. 1) or various computers and components may be networked together to perform the method in a distributed fashion.

In block 602, the system obtains the fixed design parameters for the BHA, such as borehole diameter, bit diameter, desired DLS, steering mechanism (rigid push-the-bit, elastic push-the-bit, point-the-bit) and any other parameters of the BHA design that are not being considered for optimization. In block 604, the system gets the limits on the variable parameters, e.g., the limits on bit-to-pad spacing. The system further obtains the limits on any control parameters, e.g., the limits on eccentricity that can be created by the push pad or eccentric ring.

In block 606, the system selects initial values for the variable parameters. Based on the values of the fixed and variable parameters, in block 608 the system derives at least the side force on the bit as a function of the control parameter(s), and may further determine the side-cutting angle, the bit tilt angle, and the walk angle. As described with respect to the point-the-bit model, this derivation may be an iterative process. Based on the resulting side force and/or the other values determined in block 608, the system determines, over the full control parameter range, the force-model based DLS in block 614.

In block 616, the system determines whether the DLS range (and its relationship to the control parameter(s)) is acceptable. If not, the variable parameter values are adjusted in block 617 and the process repeats from block 608. Otherwise, in block 618, the BHA is configured in accordance with the parameter values and deployed in the borehole.

In block 620, the BHA is used for directed drilling, with the control parameters being adjusted as needed to achieve the desired curvature. Once the current drilling stage is completed, the BHA may be retrieved and the borehole surveyed. Alternatively, borehole trajectory measurements may be acquired during the drilling process itself and employed for feedback control of the control parameter settings.

In block 622, the system determines whether a BHA reconfiguration is needed for the next drilling stage, and if so, the variable parameter values are adjusted in block 617 and control returns to block 608.

Numeric Examples

Figure 7:
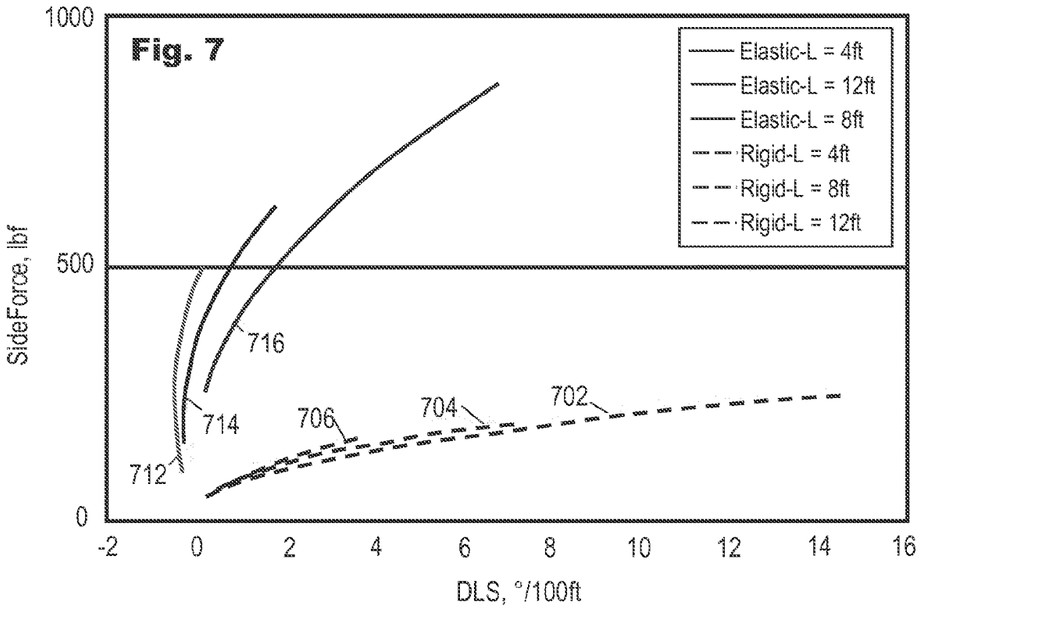
FIG. 7 is a graph showing the relationships predicted between side force and DLS for the rigid and elastic push-the-bit steering systems.

FIG. 7 shows the relationships predicted between side force and DLS for the rigid and elastic push-the-bit steering systems. Equations (5) and (20) were employed here based on the following assumptions: The dimensionless rock strength Sr is 2, the steering coefficient A is $5 \times 10^{-6}$ ft/(hr·lbf$^2$), the ROP is 100 ft/hr, the pad-to-stabilizer distance $L_2$ is 20 ft, the bit-to-pad distance $L_1$ is limited between 4-12 ft, the borehole diameter is 8.5 inches, the bit diameter is 8.5 inches, the stabilizer diameter is 8 inches, the drill pipe out diameter is 6 inches, the pad eccentricity $e_2=(r_w-r_p)$ is limited between 0.1 to 1.0 inches. For the rigid model, the modulus of the drill pipe is assumed infinite, whereas for the elastic model, the modulus is assumed to be 200 GPa.

Taking three values of 4, 8, and 12 ft for the bit-to-pad distance $L_1$, the range of side force and DLS provided by the pad eccentricity range of 0.1 to 1.0 inches is shown in FIG. 7. Curve 702 shows that in a rigid model with $L_1$=4 ft, this eccentricity range produces a side force range of approximately 50-250 lbf, with a corresponding buildup DLS variation from 0 to 15 degrees/100 ft. Reductions in the range are shown by the curves 704, 706, for $L_1$ equal to 8 and 12 ft, without significant change to the shape of the curves.

The corresponding curves 712, 714, 716 ($L_1$=4, 8, 12 ft) for the elastic model show a much different behavior, with larger side forces that are nonetheless at least partially countered by the bit tilt angle resulting from the bending. For curve 712, nearly the entire side force range of 100-500 lbf yields a negative (drop down) DLS between 0 and −0.5 degrees/100 ft! Curve 714 yields a side force range of about 150 to 600 lbf, with a DLS range between 0 and 2 degrees/100 ft. Lengthening $L_1$ to 12 ft yields curve 716, with a side force range of about 300 to 850 lbf and a corresponding DLS range from 0 to 7 degrees/100 ft. Thus, unlike the rigid model where shorter $L_1$ improves directional tendency due to higher side cutting efficiency, the elastic model exhibits better directional tendency at longer $L_1$.

Figure 8:
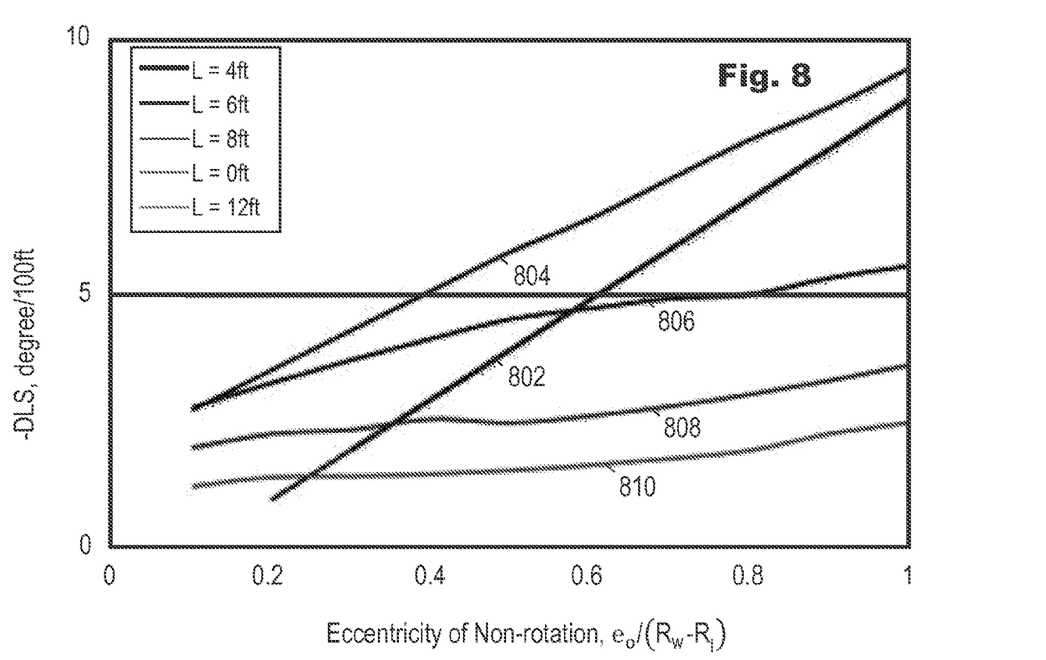

FIG. 8 shows the relationships predicted between the eccentricity provided by the non-rotating housing and the DLS for the point-the-bit system in a curved borehole. The following assumptions were employed: The dimensionless rock strength Sr is 2, the steering coefficient A is $5 \times 10^{-6}$ ft/(hr·lbf$^2$), the ROP is 100 ft/hr, the stabilizer to housing distance $L_5$ is 8 ft, the housing end to eccentric ring distance $L_4$ is 8 ft, the eccentric ring to housing head distance $L_3$ is 8 ft, the housing-to-pad distance $L_2$ is 2 ft, and the pad to bit distance $L_1$ is limited between 4-12 ft, the borehole diameter is 8.5 inches, the bit diameter is 8.5 inches, the pad diameter is 8 inches, the stabilizer diameter is 8 inches, the housing is tubular with an outer diameter of 6.5 inches, an inner diameter of 5.6 inches, and a modulus of 200 GPa. The shaft is tubular with an outer diameter of 3.5 inches, an inner diameter of 2.7 inches, and a modulus of 200 GPa. The eccentricity ring can introduce an eccentricity relative to the housing axis ($e_{ec}$) in the range between 0.1 to 1.0 inches.

Taking five values of 4, 6, 8, 10, and 12 ft for the bit-to-pad distance $L_1$, the predicted relationship between eccentricity and DLS is shown in FIG. 8. For $L_1$=4 ft, curve 802 shows a DLS range from about 1 to 9 degrees/100 ft. For $L_1$=6 ft, curve 804 shows a DLS range from about 3 to 9.5 degrees/100 ft. For $L_1$=8 ft, curve 806 shows a DLS range from about 3 to 6 degrees/100 ft. For $L_1$=10 ft, curve 808 shows a DLS range from about 2 to 3.5 degree/100 ft. For $L_1$=12 ft, curve 810 shows a DLS range from about 1 to 2.5 degrees/100 ft. When long bit-to-pad distances are used, the side force becomes small and side-cutting angle is too small to influence the walk angle. For distances that are too short, the side force can be large enough to decrease the walk angle, so the DLS will also decreases. Given these assumptions, optimal directional tendency appears to be provided for $L_1 \approx 6$ ft, where the maximum DLS is achieved.

Numerous other modifications, equivalents, and alternatives, will become apparent to those skilled in the art once the above disclosure is fully appreciated. It is intended that the following claims be interpreted to embrace all such modifications, equivalents, and alternatives where applicable.

Embodiments disclosed herein include at least:

Embodiment A: A directional tendency prediction method that includes: determining a geometry-based relationship between a borehole curvature and at least one unknown geometric parameter of a bottomhole assembly having at least a stabilizer, a bit, and an eccentering mechanism operating on at least one elastic component; determining a force-balance-based relationship between the borehole curvature and the at least one unknown geometric parameter, the force-balance-based relationship accounting for borehole curvature based on a sum of a bit tilt angle and a force-based side-cutting angle; and finding a consistent solution for both the geometry-based relationship and the force-balance-based relationship, the consistent solution associating a borehole curvature value with a setting of the eccentering mechanism.

Embodiment B: A directional tendency prediction system having an information storage medium that stores software for implementing the method of Embodiment A; and at least one processor that executes the software.

Each of foregoing embodiments may have any one of the following additional elements alone or in any suitable combination: Element 1: the method further includes employing the setting of the eccentering mechanism while drilling to achieve a borehole curvature having said value. Element 2: finding a consistent solution includes finding a range of consistent solutions for a range of settings for the eccentering mechanism to derive borehole curvature as a function of eccentricity mechanism setting. Element 3: the method further includes adjusting a variable parameter of the bottomhole assembly and repeating said finding a range of consistent solutions for a range of settings for the eccentering mechanism to derive borehole curvature as a function of eccentricity mechanism setting and said variable parameter. Element 4: the method further includes determining an optimum value of said variable parameter and configuring the bottomhole assembly to have said optimum value. Element 5: the optimum value offers a maximal borehole curvature range. Element 6: eccentering mechanism is a non-rotating push pad, and said variable parameter is a distance from the bit to the push pad. Element 7: the at least one unknown geometric parameter comprises the tool-axis to baseline separation at the push pad. Element 8: the eccentering mechanism is a eccentric ring that deforms an elastic shaft within a rigid non-rotating housing that separates the stabilizer from a pivot pad, and the variable parameter is a distance from the bit to the pivot pad. Element 9: the at least one unknown geometric parameter comprises the tool-axis to baseline separation at a proximal end of the non-rotating housing. Element 10: the deriving includes: expressing a DLS dependence on the setting of the eccentering mechanism as a tabular or functional representation; and employing the representation to set the eccentering mechanism and thereby steer the bottomhole assembly. Element 11: finding a consistent solution assumes an initial value for the curvature or the at least one unknown geometric parameter and iteratively applies the geometry-based relationship and the force-balance-based relationship to obtain increasingly refined estimates of the curvature and the at least one unknown geometric parameter that converge to the consistent solution.

What is claimed is:

1. A method that comprises:
    determining a first geometric parameter of an elastic component based on a second geometric parameter of the elastic component, wherein the elastic component is part of a bottomhole assembly having a bit and an eccentering mechanism operating on the elastic component;
    determining a length difference of the elastic component based on the first geometric parameter, the second geometric parameter, and a stiffness factor of the elastic component;
    determining a first value of an adjustable setting of the eccentering mechanism;
    determining a range of borehole curvatures using a sum of bit tilt angles and force-based side-cutting angles, wherein the force-based side-cutting angles correspond to the length difference of the elastic component and the bit tilt angles correspond to the first value of the adjustable setting; and
    based on determining that the range of borehole curvatures is not an acceptable range, determining a second value of the adjustable setting of the eccentering mechanism; and utilizing an acceptable range of borehole curvatures and the adjustable setting of the eccentering mechanism to steer the bottomhole assembly.

2. The method of claim 1, further comprising employing the second value of the adjustable setting of the eccentering mechanism while drilling.

3. The method of claim 1, wherein the first value of the adjustable setting of the eccentering mechanism is in a range of values for the adjustable setting of the eccentering mechanism.

4. The method of claim 1, further comprising adjusting the eccentering mechanism based on the second value of the adjustable setting of the eccentering mechanism.

5. The method of claim 1, wherein the first value of the adjustable setting of the eccentering mechanism offers a maximal borehole curvature range.

6. The method of claim 1, wherein the eccentering mechanism is a push pad.

7. The method of claim 1, wherein the adjustable setting of the eccentering mechanism comprises a tool-axis to baseline separation at the eccentering mechanism.

8. The method of claim 1, wherein determining the second value of the adjustable setting of the eccentering mechanism comprises:
    determining a dogleg severity dependence on the adjustable setting of the eccentering mechanism as a tabular or functional representation; and
    employing the tabular or functional representation to set the second value of the adjustable setting of the eccentering mechanism and thereby steer the bottomhole assembly.

9. The method of claim 1, wherein determining the potential bit tilt angles and force-based side-cutting angles assumes initial values for the range of borehole curvatures or the first geometric parameter and iteratively obtains increasingly refined estimates of the range of borehole curvatures or the first geometric parameter that converge to a consistent solution.

10. The method of claim 1, wherein the adjustable setting of the eccentering mechanism introduces an eccentricity that bends the elastic component.

11. The method of claim 1, wherein the adjustable setting of the eccentering mechanism is based on at least one of a first distance and a second distance, wherein the first distance is between an axis of the bottomhole assembly to a contact face of the eccentering mechanism, and wherein the second distance is between an axis of the elastic component and an axis of the eccentering mechanism.

12. The method of claim 1, wherein the eccentering mechanism is an eccentric ring that deforms an elastic shaft within a rigid non-rotating housing that separates a stabilizer of the bottomhole assembly from a pivot pad.

13. A system that comprises:
    a processor; and
    an information storage medium having software executable by the processor to cause the processor to,
        determine a first geometric parameter of an elastic component based on a second geometric parameter of the elastic component, wherein the elastic component is part of a bottomhole assembly having a bit and an eccentering mechanism operating on the elastic component;
        determine length difference of the elastic component based on the first geometric parameter, the second geometric parameter, and a stiffness factor of the elastic component;
        determine a first value of an adjustable setting of the eccentering mechanism;
        determine a range of borehole curvatures using a sum of potential bit tilt angles and force-based side-cutting angles, wherein the force-based side-cutting angles correspond to the length difference of the elastic component and the bit tilt angles correspond to the first value of the adjustable setting; and
        based on a determination that the range of borehole curvatures is not an acceptable range, determine a second value of the adjustable setting of the eccentering mechanism; and utilizing an acceptable range of borehole curvatures and the adjustable setting of the eccentering mechanism to steer the bottomhole assembly.

14. The system of claim 13, wherein the software further comprises software executable by the processor to employ the second value of the adjustable setting of the eccentering mechanism while drilling.

15. The system of claim 13, wherein the first value of the adjustable setting of the eccentering mechanism is in a range of values for the adjustable setting of the eccentering mechanism.

16. The system of claim 15, wherein the software further comprises software executable by the processor to adjust the eccentering mechanism based on the second value of the adjustable setting of the eccentering mechanism.

17. The system of claim 16, wherein the first value of the adjustable setting of the eccentering mechanism offers a maximal borehole curvature range.

18. The system of claim 15, wherein the eccentering mechanism is a push pad.

19. The system of claim 18, wherein the adjustable setting of the eccentering mechanism comprises a tool-axis to baseline separation at the push pad.

20. The system of claim 15, wherein the eccentering mechanism is an eccentric ring that deforms an elastic shaft within a rigid non-rotating housing that separates a stabilizer of the bottomhole assembly from a pivot pad.

21. The system of claim 13, wherein the software executable by the processor to determine the second value of the adjustable setting of the eccentering mechanism comprises software executable by the processor to,
  determine a dogleg severity dependence on the adjustable setting of the eccentering mechanism as a tabular or functional representation; and
  employ the tabular or functional representation to set the second value of the adjustable setting of the eccentering mechanism and thereby steer the bottomhole assembly.

22. The system of claim 13, wherein the software executable by the processor to determine the potential bit tilt angles and force-based side-cutting angles assumes initial values for the range of borehole curvatures or the first geometric parameter and iteratively obtains increasingly refined estimates of the range of borehole curvatures or the first geometric parameter that converge to a consistent solution.

23. The system of claim 13, wherein the adjustable setting of the eccentering mechanism is based on at least one of a first distance and a second distance, wherein the first distance is between an axis of the bottomhole assembly to a contact face of the eccentering mechanism, and wherein the second distance is between an axis of the elastic component and an axis of the eccentering mechanism.

24. A system that comprises:
  a bottomhole assembly, wherein the bottomhole assembly comprises an elastic component, a bit, and an eccentering mechanism operating on the elastic component;
  a processor; and
  an information storage medium having software executable by the processor to cause the processor to,
    determine a first geometric parameter of the elastic component based on a second geometric parameter of the elastic component, determine length difference of the elastic component based on the first geometric parameter, the second geometric parameter, and a stiffness factor of the elastic component,
    determine a first value of an adjustable setting of the eccentering mechanism;
    determine a range of borehole curvatures using a sum of bit tilt angles and force-based side-cutting angles, wherein the force-based side-cutting angles correspond to the length difference of the elastic component and the bit tilt angles correspond to the first value of the adjustable setting; and
    based on a determination that the range of borehole curvatures is not an acceptable range, determine a second value of the adjustable setting of the eccentering mechanism; and
    utilizing an acceptable range of borehole curvatures and the adjustable setting of the eccentering mechanism to steer the bottomhole assembly.

* * * * *